June 15, 1943.　　S. S. FIERKE ET AL　　2,322,006
PHOTOGRAPHIC FILTER AND ANTIHALATION LAYER
Filed Dec. 26, 1940
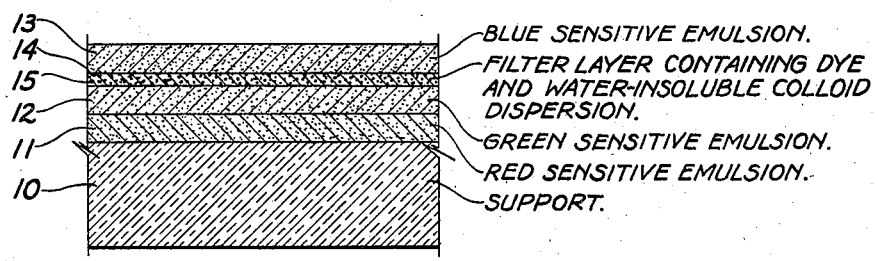
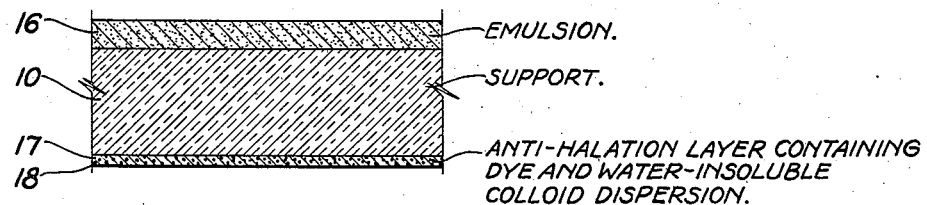
SCHEURING S. FIERKE
PAUL W. VITTUM
LOT S. WILDER
INVENTORS
BY
ATTORNEYS Patented June 15, 1943

2,322,006

UNITED STATES PATENT OFFICE 2,322,006

PHOTOGRAPHIC FILTER AND ANTI-HALATION LAYER

Scheuring S. Fierke, Paul W. Vittum, and Lot S. Wilder, Rochester, N. Y., assignors to Eastman Kodak Company, Rochester, N. Y., a corporation of New Jersey Application December 26, 1940, Serial No. 371,685
In Great Britain December 29, 1939

6 Claims. (Cl. 95—7)

This invention relates to light-absorbing photographic layers and particularly to filter and anti-halation layers for photographic film.

In the preparation of sensitive photographic elements, it is frequently desirable to incorporate one or more layers of colloidal material therein which contain dyes, leuco dyes or other coloring materials. These layers may fulfill any of a number of purposes such as the reduction of halation, filtering certain undersirable rays from the exposing light either upon direct exposure in a camera or for reexposure in a reversal process. It has usually been the practice to incorporate the coloring material directly in the colloidal medium composing the layer, for example, gelatin. Serious difficulties are frequently encountered in the preparation of colored layers by this procedure. In cases where the coloring material has a low solubility in the gelatin, it may not be possible to incorporate the necessary concentration of the coloring material or the material may separate out in large crystals or aggregates in the process of setting and drying the layer. Another trouble frequently met is the tendency of the coloring material to diffuse out of the layer in which it is incorporated into the adjoining layer or layers. Further difficulties frequently arise from a deleterious action that the coloring material may have upon the photographic properties of the sensitive layers, for instance, a fogging or desensitizing action.

It is, therefore, an object of the present invention to provide a method for incorporating dyes or other coloring materials in non-sensitive photographic layers. A further object is to provide a method for incorporating dyes in gelatin layers in sufficient quantity to exert an appreciable light filtering action. A still further object is to provide a method for rendering dyes non-diffusing in non-sensitive photographic gelatin layers. Other objects will appear from the following description of our invention.

These objects are accomplished by dissolving the dye in one or more organic solvents each of which is substantially water-insoluble and at least one of which either is non-volatile or has a boiling point above about 150° C. The solution of the dye in these solvents is then emulsified in an aqueous solution and is mixed with the gelatin used to form the light-absorbing layer.

In the accompanying drawing, Fig. 1 is a sectional view of a multi-layer photographic element having an intermediate layer made according to our invention and Fig. 2 is a sectional view of a photographic element having a backing layer made according to our invention.

The method of forming colored layers according to our invention comprises incorporating the coloring material in a second carrier which is immiscible with the colloidal material or carrier composing the layer and adding this second carrier and coloring material to the colloid of the layer in the form of highly dispersed particles. By the proper selection of the carrier for the coloring material, it is possible in some cases to incorporate the necessary concentration of coloring materials in the desired high degree of dispersion and to have the coloring materials in such physical state that they are incapable of diffusing from the layer in which they are incorporated and are more nearly inert toward the sensitive photographic material. At the same time the materials are held in a sufficiently loose state of physical combination with the carrier that they are available for any chemical reaction to which they may be subjected during the processing of the photographic material.

According to the preferred embodiment of our invention, the dye is dissolved in a low boiling organic solvent and a second solvent which is either high-boiling or has no boiling point, such as a cellulose ester, is added to the solution. Both of these solvents should be substantially water-insoluble so that a dispersion of a mixture of dye and solvents in water can be formed. In certain cases the dye can be dissolved in the second solvent alone since both the second solvent and the low boiling solvent are solvents for the dye. The suitable solvents for use in our process will be described hereinafter. The solution of dye in the solvent or solvents is emulsified in water containing a wetting agent or in a dilute gelatin solution to form a dispersion of the dye and the solvent or solvents in the aqueous solution. The low boiling solvent, if present, is then preferably removed by heating and the dispersion added to a gelatin solution which is coated on a suitable support in the desired manner.

Of the low boiling solvents suitable for use in the preparation of the dispersions according to our invention, any suitable material which is a solvent for the dye, substantially water-insoluble, and has no deleterious action on the dyes or other materials used in the dispersion, may be used. We prefer to use an ester of a lower fatty alcohol and a lower fatty acid, such as butyl acetate, but the choice of compounds is not limited to this class.

The second solvent, which is either high boiling or has no definite boiling point, may be a cellulose ester such as cellulose acetate, cellulose nitrate or cellulose ether. The use of these materials in the preparation of dispersions of dyes or couplers in sensitive emulsions is described in Mannes and Godowsky application Serial No. 314,689, filed January 19, 1940. We may also use the high boiling solvent materials described in Jelley and Vittum U. S. application Serial No. 371,612, filed December 26, 1940. These solvents are crystalloidal materials having a high solvent action for the dye and are capable of forming a liquid mixture with the dye. The characteristic feature of a crystalloidal material is that it is non-colloidal, that is, it is a substance which passes through a semipermeable membrane. High boiling solvents of this class include tricresyl phosphate, butyl phthalate, amyl phthalimide, amyl succinamide, and acetyl-N-butylaniline, although any of the solvents described in the Jelley and Vittum application Serial 371,612 are suitable.

Dyes suitable for use in the method of our invention include those having in the neutral state low water-solubility and high solubility in organic solvents and capable of forming a water-soluble compound in ordinary photographic developing solutions. The preferred dyes are those which in the neutral, that is non-salt forms, have relatively low solubility in water and high solubility in organic solvents and which, in addition, are capable of forming water-soluble salts with alkalies or acids or both. For example, in the case of a dye having in its molecule a —COOH group, the dye is capable of forming a salt with weak alkalies. The free dye may be represented as "dye-COOH" and its water-soluble salt form as "dye-COONa." If the free form of the dye in solution in a suitable water-insoluble medium is dispersed in gelatin, because of the high solubility of the dye in the dispersion medium and its low solubility in water, the dye will tend to remain almost completely within the dispersion medium. When the gelatin is treated with an alkaline solution, the "dye-COOH" is transferred into "dye-COONa" which has just the opposite solubility behavior from the free form of the dye. The salt form is soluble in water and relatively insoluble in the non-aqueous dispersion medium. This results in the complete removal of the salt form of the dye from the dispersion medium so that it can be washed out of a gelatin layer quite readily.

A similar action would take place with dyes capable of forming salts with acids, that is, basic dyes, except that here an acid treatment would be necessary to remove the dye from the dispersion medium. A dye of this character would be suitable where it was desired to retain the dye during photographic development and to remove it in fixing or other acid baths.

Dyes of the acid azo class suitable for use in gelatin layers by our dispersion method, together with the high boiling solvents which may be used with each are as follows:

| | Dye | Solvent |
|---|---|---|
| 1 | Methyl red | Tri-o-cresyl phosphate<br>n-Butyl phthalate<br>N-n-amyl phthalimide |
| 2 | 2-hydroxy-4-aminoazobenzene-4'-sulfonamide | Tri-o-cresyl phosphate<br>n-Butyl phthalate<br>N-n-amyl phthalimide |
| 3 | 4-(p-ethoxyphenylazo)-N-phenyl-glycine | Tri-o-cresyl phosphate<br>n-Butyl phthalate<br>N-n-amyl phthalimide |
| 4 | 4-phenylazo-5-pyrazolone-3-carboxylic acid | Tri-o-cresyl phosphate |
| 5 | 4-(p-sec. amyl phenylazo)-5-pyrazolone-3-carboxylic acid | Tri-o-cresyl phosphate<br>n-Buytl phthalate<br>N-n-amyl phthalimide<br>N-n-amyl succinimide<br>Oleic acid<br>Acetyl-n-butyl aniline |
| 6 | Benzeneazoresorcinol | Tri-o-cresyl phosphate<br>n-Butyl phthalate<br>N-n-amyl phthalimide<br>N-n-amyl succinimide<br>Oleic acid<br>Acetyl-n-butyl aniline |
| 7 | p,p'-Dihydroxyazobenzene | Tri-o-cresyl phosphate<br>n-Butyl phthalate<br>N-n-amyl phthalimide |
| 8 | Benzeneazosalicylic acid | Tri-o-cresyl phosphate<br>n-Butyl phthalate<br>N-n-amyl phthalimide |

Dyes 1 and 2 are removable from coatings by treatment with either an acid bath (such as 0.5 N HCl) or an alkaline bath. All the remaining dyes are removable from coatings by bathing in aqueous solutions of sodium carbonate or in developer solutions containing carbonate.

Other dyes suitable for use in our process include the pyrrole dyes described in Brooker and Sprague U. S. applications Serial Nos. 317,726 and 317,727, filed February 7, 1940, and the dyes described in Gaspar British Patent 506,385. These dyes can be discharged by photographic developers containing sulfite and alkali or by a fixing bath of the usual thiosulfate type. The following dyes are examples of these classes all of these particular dyes being absorptive of blue light. Dyes 9, 12 and 13 are the pyrrole type and dyes 10 and 11 are oxonol dyes such as those described in British Patent 506,385.

9. (3-ethyl-2-benzoxazole)-(1-p-methoxy phenyl - 2,5 - dimethyl-3-pyrrole-di-methine cyanine chloride.

Ratio of dye: solvent=1:10

10. Bis-2-methyl-5-pyrazolone (4)-methine oxonol.

Ratio of dye: solvent=1:20

11. Bis-1,3-di-($\beta$-methoxyethyl)-barbituric acid (5)-trimethine oxonol.

Ratio of dye: solvent=1:6

12. (3-ethyl-2-benzoxazole) - (1 - n-butyl-2,5-dimethyl-3-pyrrole)-dimethine cyanine chloride.

Ratio of dye: solvent=1:10

13. (3-ethyl-2-benzoxazole) - (1-p-hydroxyphenyl-2,5-dimethyl-3-pyrrole) - dimethine cyanine iodide.

Ratio of dye: solvent=1:20

The ratio of tri-o-cresyl phosphate to butyl acetate is approximately two parts of butyl acetate to one part of tri-o-cresyl phosphate. After dissolving the filter dye in tri-o-cresyl phosphate and butyl acetate solution, this solution is added to water containing a small amount of Gardinol WA or other dispersing agent, and run through a colloid mill. The ratio of water to filter dye is approximately one part of filter dye in eighty parts of water. The butyl acetate is frequently evaporated off by mild application of heat and a blast of air, although in some instances it has been found unnecessary to remove the butyl acetate before proceeding. The dispersion of dye in tri-o-cresyl phosphate, either with or without the attendant butyl acetate in the aqueous continuous phase, is then added to a 5% gelatin solution in the ratio of 1 gram of dye per 7 grams of gelatin. Then the solution containing dye dissolved in droplets of tri-o-cresyl phosphate, without or with butyl acetate, dispersed in a gelatin solution, is then coated either as an underlayer or as an intermediate layer in multiple layer materials for color photography.

The following examples, which are illustrative only, indicate methods of forming colored layers according to our invention:

Example 1

A solution of the following composition is prepared:

| | |
|---|---|
| Cellulose nitrate | grams 20 |
| Ethyleneglycol mono benzyl ether | do 10 |
| Benzeneazocresol | do 10 |
| Butyl acetate | cc 750 |

This solution is emulsified, e. g., by homogenization, with 1000 cc. of a 0.2 per cent aqueous solution of Gardinol. The emulsion is heated with stirring to expel the butyl acetate, and the remaining fine suspension of dyed cellulose nitrate particles added to 1000 cc. of a 6.5 per cent gelatin solution.

Example 2

2 grams of methyl red are dissolved in a mixture of 20 cc. of butyl acetate and 20 cc. of N-butyl phthalate. This solution is emulsified in 65 cc. of a 0.2% aqueous solution of Gardinol (a higher fatty alcohol sulfate) or other suitable wetting agent. The resulting dispersion is added to 500 cc. of a 6.5% gelatin solution. This solution is coated on a support in the usual manner.

In the accompanying drawing, Fig. 1 is a sectional view of a multi-layer film in which the support 10 of any suitable material such as cellulose ester or paper is coated with layers 11, 12 and 13 composed of gelatin containing silver halide grains sensitive, respectively, to the red, green and blue regions of the spectrum. The layer 14 is a gelatin filter layer containing dispersed particles of dye and high boiling or non-volatile solvent 15. Fig. 2 illustrates another modification of our invention according to which the support 10 is coated on one side with emulsion layer 16 and on the opposite side with gelatin layer 17 containing dispersed particles 18 of dye and high boiling solvent made according to our invention.

Numerous modifications may be made in the method of our invention and it is to be understood that it is limited only by the scope of the appended claims.

We claim:

1. The method of incorporating in a photographic gelatin layer a dye having in the neutral state, low water solubility and high solubility in organic solvents, and capable of forming a water-soluble compound in ordinary photographic developing solutions, which comprises mixing the neutral form of the dye with butyl acetate and tricresyl phosphate, emulsifying the dye and tricresyl phosphate in an aqueous solution, adding the emulsion to a gelatin solution, and coating it on a support.

2. The method of incorporating in a photographic gelatin layer a dye having in the neutral state, low water solubility and high solubility in organic solvents, and capable of forming a water-soluble compound in ordinary photographic developing solutions, which comprises mixing the neutral form of the dye with a volatile, substantially water-insoluble organic solvent for the dye and a substantially water-insoluble organic crystalloidal material having a boiling point above 175° C. and having a high solvent action for the dye and capable of forming a liquid mixture with said dye, the nature and properties of the dye and crystalloidal material being so chosen that particles thereof are liquid under conditions of coating and photographic processing, emulsifying the dye and crystalloidal material in an aqueous solution, adding the emulsion to a gelatin solution and producing dispersed liquid particles of the dye and crystalloidal material in the gelatin, and coating it on a support.

3. The method of incorporating in a photographic gelatin layer the neutral form of an acid azo dye, which comprises mixing the neutral form of the dye with a substantially water-insoluble ester of a lower fatty alcohol and a lower fatty acid, and a substantially water-insoluble organic crystalloidal material having a boiling point above 175° C. and having a high solvent action for the dye and capable of forming a liquid mixture with said dye, the nature and properties of the dye and crystalloidal material being so chosen that particles thereof are liquid under conditions of coating and photographic processing, emulsifying the dye and crystalloidal material in an aqueous solution of a wetting agent, adding the emulsion to a gelatin solution, and producing dispersed liquid particles of the dye and crystalloidal material in the gelatin, and coating it on a support.

4. The method of incorporating in a photographic gelatin layer the neutral form of an acid azo dye, which comprises mixing the neutral form of the dye with a substantially water-insoluble ester of a lower fatty alcohol and a lower fatty acid, and a substantially water-insoluble organic crystalloidal material, having a boiling point above 175° C. and having a high solvent action for the dye and capable of forming a liquid mixture with said dye, the nature and properties of the dye and crystalloidal material being so chosen that particles thereof are liquid under conditions of coating and photographic processing, emulsifying the dye and crystalloidal material in an aqueous solution of a wetting agent, evaporating the ester from the emulsion, adding the emulsion to a gelatin solution, and producing dispersed liquid particles of the dye and crystalloidal material in the gelatin, and coating it on a support.

5. The method of incorporating in a photographic gelatin layer a dye having in the neutral state, low water-solubility and high solubility in organic solvents, and capable of forming a water-soluble compound in ordinary photographic developing solutions, which comprises mixing the neutral form of the dye with butyl acetate and a substantially water-insoluble organic crystalloidal material having a boiling point above 175° C. and having a high solvent action for the dye and capable of forming a liquid mixture with said dye, the nature and properties of the dye and crystalloidal material being so chosen that particles thereof are liquid under conditions of coating and photographic processing, emulsifying the dye and crystalloidal material in an aqueous solution, adding the emulsion to a gelatin solution, and producing dispersed liquid particles of the dye and crystalloidal material in the gelatin, and coating it on a support.

6. The method of incorporating in a non-sensitive gelatin layer a dye whose color is dischargeable in ordinary photographic developing solutions which comprises dissolving the dye in a substantially water-insoluble, organic crystalloidal material, said crystalloidal material having a boiling point above about 175° C. and having a high solvent action for the dye and being capable of forming a liquid mixture with said dye, the nature and properties of the dye and crystalloidal material being so chosen that particles thereof are liquid under conditions of coating and photographic processing, emulsifying the dye and crystalloidal material in an aqueous solution, adding the emulsion to a gelatin solution, and producing dispersed liquid particles of the dye and crystalloidal material in the gelatin, and coating it on a support.

SCHEURING S. FIERKE.
LOT S. WILDER.
PAUL W. VITTUM.